Patented Apr. 24, 1951

2,550,652

UNITED STATES PATENT OFFICE 2,550,652

DIALLYL CYANAMIDE COPOLYMER COMPOSITIONS

Erhart K. Drechsel and John J. Padbury, Stamford, Conn., assignors to American Cyanamid Company, New York, N. Y., a corporation of Maine No Drawing. Application October 12, 1949, Serial No. 121,066

12 Claims. (Cl. 260—85.5)

This invention relates to the production of new materials having valuable and characteristic properties that make them especially suitable for use in industry, for example in molding, casting, coating, electrically insulating and adhesive applications, and for other purposes. More particularly the invention is concerned with polymerizable compositions comprising, by weight, (1) from 1% to 75% of diallyl cyanamide (N-diallyl cyanamide) and (2) from 25% to 99% of a compound which is different from the compound of (1), is copolymerizable therewith and which contains a $CH_2=C<$ grouping or a plurality of $CH_2=C<$ groupings, e. g., styrene, methyl acrylate, glycidyl methacrylate, vinyl acetate, diallyl phthalate, divinyl benzene, etc., as well as with products comprising the polymerized composition. The scope of the invention also includes method features whereby new and useful synthetic compositions are produced.

Diallyl cyanamide is a known compound having a boiling point of about 222° C. at 760 mm. pressure. However, to the best of our knowledge and belief it was not known prior to our invention that this compound, which is difficult (and often impossible under the usual polymerization conditions) to polymerize to a useful product, could be copolymerized with compounds containing a $CH_2=C<$ grouping in the proportions employed in carrying the present invention into effect (or in any other proportions) to produce a new series of copolymer compositions having particular properties that make them especially valuable for use in the plastics, coating and other arts. The nitrogen content of diallyl cyanamide imparts valuable properties, e. g., improved arc-extinguishing and/or flame-resisting characteristics, to many of the copolymer compositions of the invention, while the allyl groupings permit the compound to undergo a copolymerization reaction with other ethylenically unsaturated monomers.

It is one of the primary objects of the present invention to prepare a new class of copolymers for use in industry.

Another object of the invention is to provide polymerizable or potentially polymerizable molding and other compositions which have good storage stability and which can be handled without difficulty prior to and during fabrication.

Still another object of the invention is to prepare synthetic materials which are particularly useful as coating compositions and as components of coating compositions.

Another object of the invention is to prepare molding compositions from which can be produced clear, colored or translucent molded articles having a wide variety of domestic and industrial applications.

Another object of the invention is to prepare clear and colorless cast articles, as well as laminated moldings having high strength characteristics combined with other desirable properties.

Another object of the invention is to improve the usefulness of diallyl cyanamide whereby its field of utility is enhanced.

Other objects will be apparent to those skilled in the art from the following more detailed description.

The foregoing objects are attained by copolymerization of diallyl cyanamide with one or more other comonomers which are copolymerizable therewith, more particularly such comonomers which contain either a single or a plurality of $CH_2=C<$ groupings, using, by weight, from 1% to 75%, preferably from 5% to 50%, of diallyl cyanamide and from 25% to 99%, preferably from 50% to 95% of a comonomer (or comonomers) containing one or more $CH_2=C<$ groupings. Heat, light or heat and light can be used to effect polymerization of the mixture of comonomers, although under such conditions the rate of polymerization is relatively slow. Hence to accelerate the polymerization, we prefer to use a polymerization catalyst accompanied by heat, light or heat and light. Further details of polymerization conditions are given hereinafter.

Examples of monomers (comonomers) containing a $CH_2=C<$ grouping that can be copolymerized with diallyl cyanamide in the weight proportions hereinbefore mentioned, singly or a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e. g., methacrylic, ethacrylic, propacrylic, etc., and arylacrylic, e. g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e. g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e. g., styrene, o-, m- and p-chlorostyrenes, -bromostyrenes, -fluorostyrenes, -methylstyrenes, -ethylstyrenes, -cyanostyrenes, the various polysubstituted styrenes such, for example, as the various di-, tri- and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyldibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e. g., alpha-methyl styrene, alpha-methyl-para-methyl styrene, etc.; unsaturated ethers, e. g., ethyl vinyl ether, diallyl ether, ethyl methallyl ether, etc.; unsaturated amides, for instance N-allyl caprolactam, acrylamide, and N-substituted acrylamides, e. g., N-methylol acrylamide, N-allyl acrylamide, N-methyl acrylamide, N-phenyl acrylamide, etc.; unsaturated ketones, e. g., methyl vinyl ketone, methyl allyl ketone, etc.; methylene malonic esters, e. g., methylene methyl malonate, etc.; butadienes, e. g., 1,3-butadiene, 2-chlorobutadiene, etc.; unsaturated polyhydric alcohol (e. g., butenediol, etc.) esters of saturated and unsaturated aliphatic and aromatic, monobasic and polybasic acids, illustrative examples of which appear above; unsaturated glycidyl esters such as glycidyl acrylate, glycidyl methacrylate, glycidyl itaconate, glycidyl allyl phthalate, etc.

Other examples of monomers that can be copolymerized with diallyl cyanamide to produce our new copolymer compositions are the vinyl halides, more particularly vinyl fluoride, vinyl chloride, vinyl bromide and vinyl iodide, and the various vinylidene compounds, including the vinylidene halides, e. g., vinylidene chloride, vinylidene bromide, vinylidene fluoride and vinylidene iodide, other comonomers being added if needed in order to improve the compatability and copolymerization characteristics of the mixed monomers.

Other and more specific examples of monomeric materials which can be mixed or blended with diallyl cyanamide in the aforementioned proportions, and the resulting homogeneous or substantially homogeneous, polymerizable composition then polymerized, as hereinafter more fully described, to yield new and valuable copolymer compositions are the allyl compounds which are different from diallyl cyanamide and especially those which have a boiling point of at least about 60° C. Of the monomeric materials which can be used the allyl esters form a large class, all of which are suitable. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

More specific examples of allyl compounds that can be copolymerized with diallyl cyanamide are one or another or a plurality of the following (or a mixture thereof with another comonomer): allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tertallyl silane, tetrallyl silicate, hexallyl disiloxane, etc. Other examples of allyl compounds that may be employed are given, for example, in the copending application of Edward L. Kropa, Serial No. 700,833, filed October 2, 1946, now Patent No. 2,510,503, issued June 6, 1950.

Among the comonomers which are preferred for use in carrying our invention into effect are the vinyl compounds, including the vinyl aromatic compounds, more particularly the vinyl aromatic hydrocarbons (e. g., styrene, isopropenyl toluene, the various dialkyl styrenes, etc.), and the vinyl aliphatic compounds, e. g., acrylonitrile, acrylamide, etc., and other compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the alkyl grouping, examples of which are given above, as well as other vinyl aromatic and vinyl aliphatic compounds, and other compounds containing a $CH_2=C<$ grouping.

Any suitable means may be used in effecting polymerization of the admixture of diallyl cyanamide and one or more other monomers which are copolymerizable therewith. As has been mentioned hereinbefore heat or light or both, with or without a polymerization catalyst, can be used. Ultraviolet light is more effective than ordinary light. Preferably a polymerization catalyst is employed. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic peracids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide catalysts that can be employed are the following:

Tetralin hydroperoxide
Tert.-butyl diperphthalate
Cumene hydroperoxide
Tert.-butyl perbenzoate
2,4-dichlorobenzoyl peroxide
Urea peroxide
Caprylyl peroxide
p-Chlorobenzoyl peroxide
2,2-bis(tert.-butyl peroxy) butane
Hydroxyheptyl peroxide
Diperoxide of benzaldehyde Other so-called "free radical" types of catalysts, e. g., azoisobutyronitrile ($\alpha$-,$\alpha'$-bis-azoisobutyronitrile), also can be used to accelerate polymerization mainly through the ethylenically unsaturated grouping. Oxygen also can be employed as a polymerization catalyst or accelerator.

Examples of other types of catalysts that can be used are: p-toluene sulfonic acid, sulfuric acid, phosphoric acid, aluminum chloride, stannic chloride, ferric chloride, boron trifluoride, boron trifluoride-ethyl ether complex, iodine, etc. Such catalysts are especially useful when the comonomer contains a $CH_2{=}C{<}$ grouping and, also, a grouping which can be ruptured and through which polymerization can occur, e. g., a dioxolane ring as in 4-alloxymethyl-2-oxo-1,3-dioxolane, 4-vinyl-1,3-dioxolane, 4-allyl-1,3-dioxolane, 4-alloxymethyl-1,3-dioxolane, etc., or an epoxy grouping as in glycidyl acrylate, glycidyl methacrylate, etc. Such catalysts can accelerate polymerization primarily by opening up of the rupturable grouping.

The concentration of the catalyst employed is usually small, that is, for the preferred catalysts from, by weight, about 0.5 or 1 part of catalyst per thousand parts of the polymerizable composition to be polymerized to about 3 or 4 parts of catalyst per 100 parts of the monomer or mixture of comonomers. If an inhibitor of the kind hereinafter mentioned be present, up to 6 or 7% or even more, based on the weight of the polymerizable composition, may be necessary according to the concentration of the inhibitor.

If desired, the mixed monomers can be polymerized in emulsion or in solution state to yield a copolymer. In the latter case, various inert organic solvents may be employed, depending upon the particular comonomer used, e. g., toluene, xylene, dioxane, ethers (e. g., dibutyl ether), esters (e. g., butyl acetate), chlorobenzene, ethylene dichloride, ketones (e. g., methyl ethyl ketone), tertiary alcohols, for instance tertiary-butyl alcohol, tertiary-amyl alcohol, tertiary-hexyl alcohol, etc., as well as others. When the reaction is effected in solution state, then a temperature at or approaching the boiling temperature of the solution generally is used.

The polymerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The polymerization of the mixture of monomers can be effected by a continuous process as well as by a batch operation. Thus the monomeric mixture containing a trace of catalyst may be passed through a conduit with alternate hot and cool zones.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomeric mixture (or of the lowest boiling component thereof), but in all cases is below the decomposition temperature of the monomeric materials. In most cases the polymerization temperature will be within the range of 15° C. to 150° C., more particularly within the range of 20° C. or 30° C. (ordinary room temperature) to 130° C., depending upon the particular mixture of monomers employed, the particular catalyst, if any, used, the rapidity of polymerization wanted, and other influencing factors. With certain catalysts, more particularly strong acidic polymerization catalysts such, for instance, as gaseous boron trifluoride-ethyl ether complex, concentrated sulfuric acid, anhydrous aluminum chloride, etc., a substantially lower polymerization temperature often advantageously may be used, e. g., temperatures ranging between $-80°$ C. and $0°$ C. or $10°$ C. At the lower temperatures below the solidification point of the monomeric mixture (or components thereof), polymerization is effected while the mixture of monomers is dissolved or dispersed in a solvent or dispersion medium which is liquid at the temperature of polymerization. Or, if desired, the monomeric mixture, that is, the polymerizable composition, can be polymerized in dissolved or dispersed state at temperatures above its solidification point or above the solidification point of the polymerizable components thereof. The copolymer can be separated from the liquid medium in which copolymerization was effected by any suitable means, e. g., by filtration, centrifuging, solvent extraction, etc.

In some cases it may be desirable to incorporate into the polymerizable composition an inhibitor which is adapted to inhibit copolymerization of the individual monomers present in the composition. When it is desired to use the inhibitor-modified composition, a catalyst is added in an amount sufficient to promote the polymerization reaction and to yield a copolymer. Any suitable inhibitor can be used, e. g., tannin, phenol, resorcinol, hydroquinone, ascorbic acid, isoascorbic acid, phenyl-α-naphthylamine, N,N'-di-2-naphthyl-p-phenylenediamine, certain cupric salts, e. g., cupric acetate, etc. The amount of the polymerization inhibitor may be considerably varied, but ordinarily it is employed in an amount not exceeding 3%, generally less than 1%, by weight of the monomer or mixture of comonomers, e. g., from 0.01% to 0.5% or 0.6% by weight thereof.

In order that those skilled in the art better may understand how the present invention can be carried into effect, the following examples are given by way of illustration and not by way of limitation. All parts and percentages, unless otherwise stated, are by weight.

Example 1

|  | Parts | Approx. Weight, Per Cent | Approx. Mole, Per Cent |
|---|---|---|---|
| Diallyl cyanamide | 15 | 10 | 8.35 |
| Ethyl acrylate | 135 | 90 | 91.65 |
| Benzoyl peroxide | 3 | | | are mixed together, and the resulting mixture is heated in a closed container at 40° C. for 22 hours to yield a clear, sticky, solid, amber-colored resinous copolymer. During the copolymerization an exothermic reaction takes place. This copolymer can be used alone or admixed with various modifiers, e. g., resorcinol-formaldehyde resins, alkyd resins, etc., in the production of adhesive compositions.

Example 2

Same as in Example 1 with the exception that instead of 3 parts of benzoyl peroxide there is used 3 parts of azoisobutyronitrile (alpha, alpha'-bis-azoisobutyronitrile), and the time of copolymerization is 20 hours instead of 22 hours. The resulting copolymer is a clear, colorless, solid, sticky resinous mass. As in the preceding example, the reaction is exothermic. This copolymer is soluble in benzene. The benzene solution is filtered, and hexane is added to the filter solution to precipitate the copolymer. A nitrogen analysis of the dried, precipitated copolymer shows 1.48% N which corresponds to 6.45% of diallyl cyanamide combined in the copolymer.

Example 3

|  | Parts | Approx. Weight, Per Cent | Approx. Mole, Per Cent |
|---|---|---|---|
| Diallyl cyanamide | 75 | 50 | 45.1 |
| Ethyl acrylate | 75 | 50 | 54.9 |
| Benzoyl peroxide | 3 | | |

The same procedure is followed as described under Examples 1 and 2 with the exception that the heating period is 168 hours. The resulting copolymer is a clear, viscous, lemon-colored, liquid mass. When the heating is continued for an additional 552 hours, the viscosity of the liquid increases greatly and the liquid copolymer is almost clear.

Example 4

Same as in Example 3 with the exception that 3 parts of azoisobutyronitrile is used as a polymerization catalyst instead of 3 parts of benzoyl peroxide. A clear, viscous, slightly colored, liquid copolymer is obtained after heating for 168 hours, while a light-colored, translucent, sticky, solid, resinous copolymer is obtained when heated for an additional 552 hours.

Example 5

|  | Parts | Approx. Weight, Per Cent | Approx. Mole, Per Cent |
|---|---|---|---|
| Diallyl cyanamide | 15 | 10 | 4.6 |
| Acrylonitrile | 135 | 90 | 95.4 |
| Benzoyl peroxide | 3 | | | are mixed together, and the resulting mixture is heated in a closed container for 10 hours at 40° C., yielding a powdery, opaque, solid copolymer which is almost white in color. As in Examples 1 and 2, an exothermic reaction occurs during the heating period. This copolymer is suitable for use in the production of films, fibers, rods, etc., e. g., by dissolving in a suitable solvent such as dimethyl formamide, a concentrated aqueous solution of calcium thiocyanate, etc., and then spinning the resulting solution of the copolymer, followed by stretching the spun fiber to orient the molecules along the fiber axis.

A copolymer having similar characteristics is obtained when 3 parts of azoisobutyronitrile is substituted for 3 parts of benzoyl peroxide in the above formulation.

Example 6

|  | Parts | Approx. Weight, Per Cent | Approx. Mole, Per Cent |
|---|---|---|---|
| Diallyl cyanamide | 75 | 50 | 30.3 |
| Acrylonitrile | 75 | 50 | 69.7 |
| Benzoyl peroxide | 3 | | |

The same procedure is followed as described under Example 5 with the exception that the time of heating at 40° C. is 90 hours instead of 10 hours. The resulting copolymer is a tan-colored, opaque, powdery, solid material.

Example 7

Same as in Example 6 with the exception that 3 parts of azoisobutyronitrile is employed in place of 3 parts of benzoyl peroxide and the heating period at 40° C. is 40 hours instead of 90 hours. The solid coppolymer which results from the copolymerization reaction is similar to the product of Example 6 with the exception that it is lemon-colored instead of tan-colored.

Example 8

|  | Parts | Approx. Weight, Per Cent | Approx. Mole, Per Cent |
|---|---|---|---|
| Diallyl cyanamide | 15 | 10 | 8.65 |
| Styrene | 135 | 90 | 91.35 |
| Benzoyl peroxide | 3 | | | are mixed together, and the resulting mixture is heated in a closed container for 168 hours at 40° C. to yield a translucent, resinous, slightly colored, solid copolymer. After heating this copolymer for an additional 24 hours at 100° C., it becomes hard, brittle and amber-colored. This copolymer, alone or admixed with a filler, dye, pigment, opacifier, lubricant or other effect agent can be used, for example, in the production of molding compositions from which molded articles having a wide variety of domestic and industrial applications can be made. The Rockwell hardness (A. S. T. M. D-785,48T, Method B, Alpha scale) of the unfilled copolymer is 58.

*Example 9*

Exactly the same formulation and procedure are followed as described under Example 8 with the exception that 3 parts of azoisobutyronitrile is employed instead of 3 parts of benzoyl peroxide. The copolymer thereby obtained is a translucent, hard, solid, resinous material which is lemon-colored. Its Rockwell hardness is 53.

*Example 10*

|  | Parts | Approx. Weight, Per Cent | Approx. Mole, Per Cent |
|---|---|---|---|
| Diallyl cyanamide | 75 | 50 | 46.1 |
| Styrene | 75 | 50 | 53.9 |
| Benzoyl peroxide | 3 | | |

The same procedure is followed as described under Examples 3 and 4. The resulting copolymer is a translucent, viscous, lemon-colored liquid, which retains essentially these same characteristics after a total polymerization period of 720 hours, that is, for an additional 552 hours after the initial heating period of 168 hours. This copolymer can be used as a plasticizer for various polyvinyl resins.

*Example 11*

Same as in Example 10 with the exception that 3 parts of azoisobutyronitrile is employed in place of 3 parts of benzoyl peroxide. The translucent, lemon-colored liquid copolymer that is obtained after a heating period of 168 hours is a very viscous material having a considerably higher viscosity than the liquid copolymer of Example 10 after a corresponding heating period.

*Example 12*

|  | Parts | Approx. Weight, Per Cent | Approx. Mole, Per Cent |
|---|---|---|---|
| Diallyl cyanamide | 112.5 | 75 | 56.6 |
| Acrylonitrile | 37.5 | 25 | 43.4 |
| Azoisobutyronitrile | 3.0 | | | are mixed together to form a homogeneous mass. This mixture of monomers and polymerization catalyst is then heated in a closed vessel fitted with a screw top for 168 hours at 40° C., yielding a yellow, sticky, granular, opaque, solid, resinous copolymer, which becomes gummy and rubber-like upon standing at room temperature for an additional 35 days. This copolymer advantageously can be used as a component of binding and adhesive compositions.

*Example 13*

|  | Parts | Approx. Weight, Per Cent | Approx. Mole, Per Cent |
|---|---|---|---|
| Diallyl cyanamide | 50 | 33.3 | 36.8 |
| Glycidyl methacrylate | 100 | 66.7 | 63.2 |
| Azoisobutyronitrile | 3 | | | are mixed and heated together in a closed vessel for 24 hours at 40° C. to obtain a clear, resinous polymerization product having a light lemon color. This copolymer is especially suitable for use, e. g., in solution in an organic solvent or dispersed in water, as an agent for the treatment of wool to reduce its tendency to shrink.

*Example 14*

|  | Parts | Approx. Weight, Per Cent | Approx. Mole, Per Cent |
|---|---|---|---|
| Diallyl cyanamide | 1.5 | 1 | 1.05 |
| n-Butyl acrylate | 148.5 | 99 | 98.95 |
| Cumene hydroperoxide | 3.0 | | |

A mixture of the above ingredients is heated for 480 hours at 100° C. The resulting copolymer is a clear, very viscous, liquid material having a light-amber color, which can be used as a plasticizer of various synthetic resins which normally have insufficient plastic flow.

*Example 15*

|  | Parts | Approx. Weight, Per Cent | Approx. Mole, Per Cent |
|---|---|---|---|
| Diallyl cyanamide | 7.5 | 5 | 4.01 |
| Vinylidene chloride | 142.5 | 95 | 95.99 |
| Azoisobutyronitrile | 1.5 | | |

The same temperature and time of heating are employed as described under Example 13. A white, opaque, powdery, solid, thermoplastic copolymer of vinylidene chloride and diallyl cyanamide is obtained. This copolymer can be hot drawn to yield monofilaments, rods, bars, tubes, etc., having a wide variety of commercial uses.

*Example 16*

|  | Parts | Approx. Weight, Per Cent | Approx. Mole, Per Cent |
|---|---|---|---|
| Diallyl cyanamide | 30 | 20 | 15 |
| Vinyl acetate | 120 | 80 | 85 |
| Caprylyl peroxide | 3 | | | are mixed together and the resulting mixture is heated for 504 hours at 40° C. yielding a clear, liquid, copolymerization product, which can be used as a plasticizer for various synthetic resins that normally have insufficient plastic flow.

*Example 17*

|  | Parts | Approx. Weight, Per Cent | Approx. Mole, Per Cent |
|---|---|---|---|
| Diallyl cyanamide | 3 | 2 | 2.51 |
| Cyclohexyl acrylate | 147 | 98 | 97.49 |
| Benzoyl peroxide | 3 | | |

A mixture of the above ingredients is heated for 168 hours at 140° C. A clear, sticky, solid, resinous copolymer is obtained from the copolymerization reaction. This copolymer is suitable for use as an adhesive or as a component of adhesive compositions, as well as in the production of various coating compositions.

*Example 18*

|  | Parts | Approx. Weight, Per Cent | Approx. Mole, Per Cent |
|---|---|---|---|
| Diallyl cyanamide | 60.0 | 40 | 41 |
| N-n-Butyl acrylamide | 90.0 | 60 | 59 |
| Azoisobutyronitrile | 0.75 | | | are mixed together and the resulting mixture is heated for 264 hours at 40° C. to obtain a clear, lemon-colored, sticky, solid copolymer, which can be used as a modifier of other synthetic resins, as well as in various adhesive compositions.

Example 19

|  | Parts | Approx. Weight, Per Cent | Approx. Mole, Per Cent |
|---|---|---|---|
| Diallyl cyanamide | 7.5 | 5 | 3.75 |
| Styrene | 120.0 | 80 | 70.4 |
| Acrylonitrile | 22.5 | 15 | 25.85 |
| Acetyl peroxide | 3.0 | | | are mixed together, after which the resulting mixture is heated for 168 hours at 40° C. A clear, brittle, solid, resinous copolymer having a pale-yellow color is obtained. It can be compounded with fillers such as alpha-cellulose, wood flour, asbestos, etc., to yield a wide variety of molding compositions which can be molded under heat and pressure to form molded articles. The Rockwell hardness of the unfilled copolymer is 93.

Example 20

|  | Parts | Approx. Weight, Per Cent | Approx. Mole, Per Cent |
|---|---|---|---|
| Diallyl cyanamide | 15 | 10 | 8.5 |
| Styrene | 75 | 50 | 49.9 |
| Ethyl acrylate | 60 | 40 | 41.6 |
| Azoisobutyronitrile | 3 | | |

The same temperature and heating period are employed as described under Example 19. The resulting copolymer is a milky white, non-sticky, rubbery, solid material.

Example 21

|  | Parts | Approx. Weight, Per Cent | Approx. Mole, Per Cent |
|---|---|---|---|
| Diallyl cyanamide | 15 | 10 | 7.77 |
| Styrene | 60 | 40 | 36.45 |
| Ethyl acrylate | 60 | 40 | 37.85 |
| Acrylonitrile | 15 | 10 | 17.88 |
| Benzoyl peroxide | 3 | | |

These materials are mixed and heated for 168 hours at 40° C., yielding a slightly cloudy, lemon-colored, solid, copolymer which is tough but not brittle. It is especially suitable for use in the production of laminating compositions which can be employed in bonding together, under heat and pressure, superimposed sheets of paper, cloth formed of cotton, nylon, glass fibers, etc., to yield a laminated article.

Example 22

|  | Parts | Approx. Weight, Per Cent | Approx. Mole, Per Cent |
|---|---|---|---|
| Diallyl cyanamide | 25 | 25 | 21.5 |
| Ethyl acrylate | 75 | 75 | 78.5 |
| Water | 400 | | |
| Sodium lauryl sulfate (emulsifying agent) | 5 | | |
| Ammonium persulfate | 1 | | | are mixed together, and the resulting mixture is heated to 80° C. A slight exotherm occurs, whereby the temperature is raised to 89° C. with vigorous refluxing. An ice bath is employed to keep the temperature from going higher than 90° C. until the reaction has subsided. After a total heating period of 4 hours at 85°–90° C., the resulting brown-colored emulsion is broken by freezing the entire reaction mass with a Dry Ice-acetone bath. Upon thawing, the polymer is found to be a tan-colored, elastic sticky mass. It is kneaded continuously for one hour to remove traces of ionic matter (from the polymerization catalyst) and the emulsifying agent. The resulting product is dried in a forced-draft oven at 70° C. for 12 hours, during which time the copolymer becomes darker in color. Analysis of this copolymer shows 3.7% N, which corresponds to 16.15% of diallyl cyanamide combined in the copolymer.

Example 23

|  | Parts | Approx. Weight, Per Cent | Approx. Mole, Per Cent |
|---|---|---|---|
| Diallyl cyanamide | 25 | 25 | 12.7 |
| Acrylonitrile | 75 | 75 | 87.3 |
| Water | 400 | | |
| Sodium lauryl sulfate | 5 | | |
| Ammonium persulfate | 1 | | | are mixed together, and the resulting mixture is heated to 80° C. There is no evidence of exothermic reaction, as is the case in preparing the copolymer of Example 22. After heating for 2 hours at 85°–90° C., the emulsion appears to be partially broken as evidenced by the fact that some solid matter precipitates. After heating for a total of 4 hours at 85°–90° C., the reaction mixture is a solid, granular mass. The crude copolymer is filtered off and washed with water until free of ionic matter and emulsifying agent. The wet, granular copolymer is then slurried in about 480 parts of methanol, and washed with an additional 800 parts of methanol to remove any occluded, unpolymerized diallyl cyanamide. The wet copolymer is then dried in a forced-draft oven for 12 hours at 70° C. The dry copolymer is swollen but not dissolved by dimethyl formamide, indicating that some cross-linking has occurred.

In all of the aforementioned examples, the weight and mole percentages given in the individual examples refer to the percentage of monomer based on the total amount of monomers undergoing copolymerization.

Example 24

|  | Parts |
|---|---|
| 2-amino-4,6-dialloxy-1,3,5-triazine | 65.0 |
| Diallyl tetrafluorosuccinate | 30.0 |
| Diallyl cyanamide | 5.0 |
| Benzoyl peroxide | 3.0 |

Eight plies of alpha-pulp paper, 10 mils thick, are coated and impregnated with the above mixture of ingredients warmed to about 60° C. The impregnated sheets are superimposed and then laminated together by heating between glass plates at contact pressure for 2 hours at 100° C. A hard, rigid, laminated article is obtained.

Example 25

|  | Parts |
|---|---|
| 2,5-dichlorostyrene | 72.5 |
| Diallyl tetrafluorosuccinate | 22.5 |
| Diallyl cyanamide | 5.0 |
| Lauroyl peroxide | 1.0 | are mixed and copolymerized by heating the mixture for 24 hours at 100° C., yielding a solid copolymer having good flame-resisting characteristics.

Example 26

| | Parts |
|---|---|
| Diallyl cyanamide | 5.0 |
| Diallyl tetrafluorosuccinate | 5.0 |
| 2-amino-4,6-dialloxy-1,3,5-triazine | 35.0 |
| Ethylene glycol fumarate (crystalline) | 55.0 |
| Wood flour | 66.7 |
| Benzoyl peroxide | 0.5 |

The above ingredients are mixed together for several hours, compacted and sheeted. The sheets are pulverized to form a molding composition, a sample of which is molded for 5 minutes at 100° C. under a pressure of about 50 pounds per square inch. A hard, tough, molded article having a good surface finish is obtained. Similar results are obtained when pulverized mica (325 mesh) is substituted for wood flour in the above formula.

Example 27

| | Parts |
|---|---|
| Diallyl cyanamide | 10 |
| Diallyl tetrafluorosuccinate | 95 |
| Methyl methacrylate | 95 |
| Benzoyl peroxide | 2 | yield a hard, well-cured copolymer upon heating the mixed ingredients for 16 hours at about 65° C. The hardness is further increased by heating for 2½ hours at 110° C.

Example 28

| | Parts |
|---|---|
| Styrene | 91 |
| Triallyl cyanurate | 3 |
| Diallyl tetrafluorosuccinate | 3 |
| Diallyl cyanamide | 3 |
| Benzoyl peroxide | 1 | are mixed and copolymerized by heating for 48 hours at 100° C. A solid copolymer is obtained which swells but does not dissolve when immersed in toluene for several days. Triallyl cyanurate can be prepared, for example, by methods such as are described in the copending applications of James R. Dudley, Serial Nos. 700,839 and 700,840, both of which applications were filed October 2, 1946, now Patent No. 2,510,564, issued June 6, 1950, and Patent No. 2,537,816, issued January 9, 1951, respectively.

Example 29

| | Parts |
|---|---|
| Diallyl cyanamide | 10 |
| Glycol dimethacrylate | 15 |
| Diallyl tetrafluorosuccinate | 35 |
| Diallyl phthalate | 40 |
| Benzoyl peroxide | 1 | yield a hard, substantially insoluble, substantially infusible, resinous copolymer when the mixed ingredients are heated together for 5 hours at 105°–110° C.

Example 30

| | Parts |
|---|---|
| Diallyl cyanamide | 5.0 |
| Dimethallyl tetrafluorosuccinate | 7.5 |
| Methyl acrylate | 87.5 |
| Benzoyl peroxide | 1.0 | are mixed and heated together for 24 hours at 70° C. and for another 24 hours at 100° C., yielding a solid copolymer.

Example 31

| | Parts |
|---|---|
| Diallyl cyanamide | 10 |
| Diallyl phthalate | 35 |
| Diethyl itaconate | 55 |
| Benzoyl peroxide | 1 | are mixed and heated together for 3 hours at 105° C. yielding a hard, resinous copolymer.

Example 32

| | Parts |
|---|---|
| Diethylene glycol fumarate sebacate [1] | 350.0 |
| Triallyl cyanurate | 37.5 |
| Styrene | 37.5 |
| Diallyl succinate | 37.5 |
| Diallyl cyanamide | 37.5 |
| Benzoyl peroxide | 2.5 |

[1] NOTE.—This unsaturated alkyd resin is prepared by effecting reaction between 6 moles diethylene glycol, 5 moles fumaric acid and 1 mole sebacic acid.

The above ingredients are mixed while warming on a steam bath to insure complete solution of the peroxide catalyst. A 2-ply laminated article is made by curing, between glass plates, two superimposed sheets of glass cloth that are impregnated with the above polymerizable composition, for 2 hours at 120° C. and at contact pressure. The laminate is completely cured, hard, compact, glossy, transparent and flexible. The copolymer of diethylene glycol fumarate sebacate, triallyl cyanurate, styrene, diallyl succinate and diallyl cyanamide, which is produced in situ, fills the interstices of the sheets of glass cloth.

Example 33

This example illustrates the results obtained when an attempt is made to polymerize diallyl cyanamide in the absence of a copolymerizable monomer.

| | Parts |
|---|---|
| Diallyl cyanamide | 150 |
| Benzoyl peroxide | 3 |

When a mixture of the above ingredients is heated for 168 hours at 40° C., there is no apparent increase in viscosity, indicating that little or no polymerization has occurred. Upon heating for an additional 552 hours at the same temperature, a solid precipitates in an amount corresponding to about 15 parts, while the supernatant liquid appears to have about the same viscosity as the initial monomer. This condition is not changed when the product is allowed to stand for an additional 35 days at room temperature; that is, no additional solid (presumably polymeric diallyl cyanamide) is obtained and there is no apparent increase in the viscosity of the supernatant liquid.

The results are almost identical when 3 parts of azoisobutyronitrile is used in place of 3 parts of benzoyl peroxide in the above formulation.

It will be understood, of course, by those skilled in the art that our invention is not limited to the particular comonomers named in the above illustrated examples, nor to the particular proportions thereof, nor to the particular methods of copolymerization given therein. Thus, instead of the specific polymerization catalysts specified in the individual examples, any other polymerization catalyst, numerous examples of which have been mentioned hereinbefore, can be employed. Depending upon the particular properties desired in the copolymer composition and the specific use intended for the composition, the comonomer can be varied as desired or as conditions may require so long as it contains one or more CH$_2$=C< groupings, is different from diallyl cyanamide and is compatible and copolymerizable therewith. For instance, the copolymer may be a cyanoalkyl ester of an acrylic acid, e. g., mono-, di- and tricyanomethyl esters of acrylic acid, methacrylic acid, etc., the mono-, di- and tri-(β-cyanoethyl) esters of acrylic acid, methacrylic acid, etc. Or, the comonomer can be any other organic compound which is copolymerizable with diallyl cyanamide and which is represented by the general formula

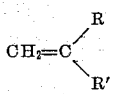

where R represents a member of the class consisting of hydrogen, halogen (chlorine, fluorine, bromine or iodine), alkyl (e. g., methyl, ethyl, propyl, butyl to octadecyl, inclusive), including cycloalkyl (e. g., cyclohexyl, etc.), aryl (e. g., phenyl, xenyl, naphthyl, etc.), alkaryl (e. g., tolyl, xylyl, ethylphenyl, etc.), aralkyl (e. g., benzyl, phenylethyl, etc.) and R' represents an aryl radical or a radical represented by the formula

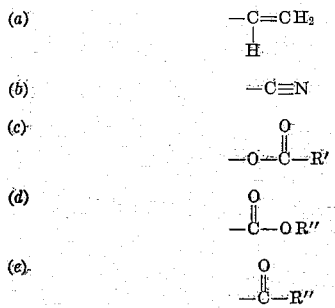

where R'' represents an alkyl, alkoxyalkyl (e. g., methoxymethyl, methoxyethyl, ethoxyethyl, ethoxypropyl, propoxybutyl, etc.) or a carbocyclic radical (e. g., aryl, alkaryl, hydroaromatic, etc.). Examples of compounds embraced by the aforementioned general formula

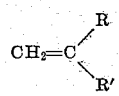

are the vinyl esters (e. g., vinyl acetate, etc.), methyl vinyl ketone, isoprene, 1,3-butadiene, 2-chloro-1,3-butadiene, acrylonitrile, various esters of acrylic acid (e. g., methyl acrylate, ethyl acrylate, cyclohexyl acrylate, tetrahydronaphthyl acrylate, decahydronaphthyl acrylate, methoxyethyl acrylate, ethoxyethyl acrylate, etc.), as well as others that will be obvious to those skilled in the art.

The polymerizable compositions of this invention comprising a mixture of diallyl cyanamide and one or more other compatible, copolymerizable compounds containing a CH$_2$=C< grouping or a plurality of such groupings, in the weight proportions of from 1% to 75% (e. g., 10 or 20% to 60 or 70%) of the former to from 25% to 99% (e. g., 30 or 40% to 80 or 90%) of the latter have a wide variety of applications. For instance, with or without a filler they can be used in the production of molding compositions and molded articles; as the binder in the production of laminated articles; while those which are normally liquids or are convertible into liquids, e. g., by dissolving in a suitable solvent, can be employed as coating compositions (or as components of such compositions) for use in finishes for wood, metals, plastics, etc., or in the treatment of fibrous materials, e. g., paper, cloth, leather, etc., or as impregnants for various porous materials such as porous metal castings, ceramic ware, fibrous materials of all kinds, etc. In using the polymerizable compositions or the liquid copolymers in the production of laminated articles, a fibrous material, e. g., paper or sheets of cloth, asbestos, etc., is impregnated with the polymerizable composition or liquid copolymer. The dried, impregnated sheets are superimposed and bonded together under heat (e. g., at 40°-200° C.) and pressure, for example at pressures ranging from contact pressure up to 4,000 or 5,000 or more pounds per square inch depending upon the particular composition employed. For many purposes where high strength materials are required, glass cloth is especially suitable for the production of laminates, but other fibrous materials can be employed in addition to those aforementioned, e. g., those composed of or comprising cellulose esters (e. g., cellulose acetate), regenerated cellulose fibers (e. g., viscose and cuprammonium rayons, etc.), other synthetic fibers (e. g., nylon, polyacrylonitrile fibers, fibers formed from polymeric and copolymeric vinylidene chloride compositions, etc.), as well as others. Our new polymerizable compositions and liquid copolymers also may be used in various electrically insulating applications, e. g., as coil impregnants.

The copolymers of our invention also are particularly useful in the production of molded articles. The compositions may be employed alone or admixed with a filler, dye, pigment, opacifier, lubricant, etc. Among the fillers that can be employed are alpha-cellulose pulp, asbestos fibers, cotton flock, chopped cloth cuttings, glass fibers, wood flour, mica dust, antimony oxide, titanium dioxide, sand, clay, diatomaceous earth, etc.

The liquid polymerizable compositions and liquid copolymers which are capable of undergoing polymerization or further copolymerization to solid state also may be used in the production of castings. Such compositions likewise can be employed as adhesives, for instance, in the production of optical devices containing a plurality of elements, examples of which are compound lenses, compound prisms, Nicol prisms, etc.

Natural or synthetic resins and other modifiers can be incorporated into the copolymeric compositions of our invention in order to modify the latter and obtain products which are especially suited for a particular application. Examples of such modifying agents are shellac, ester gum, cellulose esters and ethers, urea-aldehyde resins, aminotriazine-aldehyde resins (e. g., melamine-formaldehyde resins), phenol-aldehyde resins, hydrocarbon-substituted polysiloxane resins, e. g., methyl polysiloxane resins, methyl phenyl polysiloxane resins, phenyl polysiloxane resins, alkyd resins, etc. Our copolymeric compositions also can be modified by incorporating therein various rubbery products such as those which comprise natural rubber, synthetic rubber-like materials, as well as mixtures thereof.

We claim:

1. A polymerizable composition comprising, by weight, (1) from 1% to 75% of diallyl cyanamide, (2) from 25% to 99% of a compound which is different from the compound of (1), is copolymerizable therewith and which contains a CH$_2$=C< grouping, and (3) a catalyst for accelerating the copolymerization of the ingredients of (1) and (2).

2. A product comprising a copolymer of copolymerizable ingredients including, by weight, (1) from 1% to 75% of diallyl cyanamide and (2) from 25% to 99% of a compound which is different from the compound of (1), is copolymerizable therewith and which contains a $CH_2=C<$ grouping.

3. A composition comprising a copolymer of copolymerizable ingredients including, by weight, (1) from 5% to 50% of diallyl cyanamide and (2) from 50% to 95% of a vinyl compound.

4. A composition as in claim 3 wherein the vinyl compound of (2) is a vinyl aromatic compound.

5. A composition as in claim 4 wherein the vinyl aromatic compound is a vinyl aromatic hydrocarbon.

6. A composition as in claim 5 wherein the vinyl aromatic hydrocarbon is styrene.

7. A composition as in claim 3 wherein the vinyl compound is a vinyl aliphatic compound.

8. A composition as in claim 7 wherein the vinyl aliphatic compound is acrylonitrile.

9. A composition as in claim 7 wherein the vinyl aliphatic compound is an alkyl ester of an acrylic acid.

10. A composition as in claim 9 wherein the alkyl ester is an alkyl acrylate containing not more than 4 carbon atoms in the alkyl grouping.

11. The method of preparing a new synthetic composition which comprises polymerizing a polymerizable mixture containing, by weight, (1) from 1% to 75% of diallyl cyanamide and (2) from 25% to 99% of a compound which is different from the compound of (1), is copolymerizable therewith and which contains a $CH_2=C<$ grouping.

12. The method of preparing a new synthetic composition which comprises polymerizing a polymerizable mixture containing, by weight, (1) from 1% to 75% of diallyl cyanamide, (2) from 25% to 99% of a compound which is different from the compound of (1), is copolymerizable therewith and which contains a $CH_2=C<$ grouping, and (3) a catalyst for accelerating the copolymerization of the ingredients of (1) and (2).

ERHART K. DRECHSEL.
JOHN J. PADBURY.

REFERENCES CITED

The following references are of record in the file of this patent:

UNITED STATES PATENTS

| Number | Name | Date |
|---|---|---|
| 1,659,793 | Vliet | Feb. 21, 1928 |

OTHER REFERENCES

"Organic Syntheses," vol. I, by Gilman et al., 2nd ed. published by John Wiley and Sons, pages 203–204.